3,387,016
AMINOORGANOSILANES
Siegfried Nitzsche and Paul Buchheit, Burghausen, Bavaria, Germany, assignors to Wacker-Chemie, G.m.b.H., Munich, Bavaria, Germany
No Drawing. Filed Sept. 14, 1964, Ser. No. 396,386
Claims priority, application Germany, Sept. 20, 1963, W 35,288
3 Claims. (Cl. 260—448.8)

ABSTRACT OF THE DISCLOSURE

Aminoorganosilanes useful as intermediates in the preparation of and modification of organic and organosilicone compounds and polymers and as adhesives, binding agents and sizing agents are defined by the general formula $$R_aX_{3-a}SiR'OR'NH_x[CH_bCH(OH)Y]_{2-x}$$

where $x$ is 1 or 2, $a$ is 0, 1 or 2, $b$ is 1 or 2, R is a monovalent hydrocarbon radical, R' is a divalent hydrocarbon radical, Y is H or certain organic radicals, halogenated organic radicals or epoxy derivatives of such organic radicals, particularly R and R'.

---

The present invention relates to novel aminosilanes, salts of such silanes and to methods for producing such materials.

This invention introduces novel aminosilanes and derivatives of such silanes which are useful as adhesives as well as binding agents for use on glass fibers and other inert materials employed as reinforcing agents and fillers in resin mouldings and the like. The objects of this invention include the introduction of novel aminoorganosilicon compounds and a method of preparing them and the introduction of a novel glass-priming agent for use in the preparation of glass fiber reinforced resins. A glassfiber finish and an adhesive for use on inert fibers and powders is also an object of this invention. A novel organofunctional silane is also introduced. The foregoing and other objects and advantages of this invention are detailed in or will be obvious from the disclosure and claims following.

This invention relates to the reaction of (I) an organosilane of the general formula $R_aX_{3-a}SiR'$—O—R'—$NH_2$ where X is a hydrolyzable substituent free of active hydrogen, R is a monovalent hydrocarbon radical of 1–19 inclusive carbon atoms, R' is a divalent hydrocarbon radical of 1–12 inclusive carbon atoms and $a$ is 0, 1 or 2 with (II) an epoxy compound of the general formula

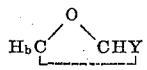

$$H_bC\overset{O}{\diagup\diagdown}CHY$$

where Y is (a) a hydrogen atom, (b) a monovalent or divalent hydrocarbon radical of 1–19 inclusive carbon atoms, (c) a monovalent or divalent radical containing carbon atoms, hydrogen atoms and oxygen atoms present as C—O—C linkages, (d) halogenated derivatives of (b), or (c), or (e) epoxy derivatives of (b), (c) or (d), $b$ is 1 when Y is divalent and $b$ is 2 when Y is hydrogen or a monovalent radical. The product of the reaction is a silane of the general Formula III

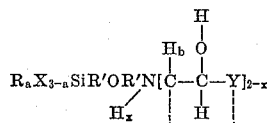

$$R_aX_{3-a}SiR'OR'N[\underset{H_x}{\overset{H}{\underset{|}{C}}}-\underset{H}{\overset{H_b\ O}{\underset{|}{C}}}-Y]_{2-x}$$

where $x$ is 1 or 2.

The silanes employed as reactant (I) herein can be prepared by any desired method. One particularly useful method for preparing such silanes consists of reacting a chloroorganosilane of the general formula $$R_aX_{3-a}SiR'Cl$$

where X, R, R' and $a$ are as above defined with an alkaliaminoalcoholate of the general formula $MR'NH_2$ where R' is as above defined and M is an alkali metal such as Li, Na, K, Rb, or Cs. This reaction is fully described and characterized in the copending United States patent application Ser. No. 295,823, filed July 17, 1963 and fully incorporated herein by specific reference thereto.

The silanes (I) can be substituted with 0, 1 or 2 monovalent hydrocarbon radicals represented by R and exemplified but not limited by alkyl radicals of the formula $-C_zH_{2z+1}$ where $z$ is 1–19 inclusive and particularly $-CH_3$, $-C_2H_5$ and $-C_3H_7$; alkenyl radicals such as vinyl, allyl and hexenyl; cycloalkyl radicals of the formula $-C_zH_{2z-1}$ such as cyclobutyl, cyclopentyl and cyclohexyl; cycloalkenyl radicals such as cyclopentenyl and cyclohexenyl radicals; aryl radicals such as phenyl, xenyl, naphthyl and phenanthryl radicals; aralkyl radicals such as benzyl, β-phenylethyl and xylyl; and alkaryl radicals such as ethylphenyl, methylxenyl and tolyl. Preferably the R substituents are not branched in the α-position to the Si. The preferred R substituents contain less than 7 carbon atoms, the most preferred being $-CH_3$, $-C_2H_5$, $-CH=CH_2$ and $-C_6H_5$.

The hydrolyzable substituents bonded to Si are represented by X and are free of active hydrogen. The expression "free of active hydrogen" indicates that the hydrolyzable substituent does not contain hydrogen atoms which form methane when the silane is contacted with methyl magnesium iodide. The hydrolyzable substituents can be exemplified by halogen atoms, —OR groups where R is as above defined, halogenohydrocarbonoxy groups, organic radicals containing hydrogen and carbon atoms and oxygen atoms present as C—O—C linkages as well as the C—O—Si linkage and —$ONR_2$ groups where R is above defined. Examples of the substituents represented by X include —$OCH_3$, —$OC_2H_5$, —$OC_4H_9$, —$OC_2F_5$, —$O(CH_2CH_2O)_nA$ where A is an aliphatic hydrocarbon radical with 1–4 carbon atoms and $n$ is an integer, —$OC_6H_5$, —$N(CH_3)_2$, —$N(C_2H_5)$ and $$-N(CH_3)(C_2H_5)$$

The preferred substituents are hydrocarbonoxy radicals (—OR) and oxyhydrocarbonoxy radicals containing oxygen atoms as C—O—C linkages, and particularly —$OCH_3$, —$OC_2H_5$ and —$O(C_2H_4O)_nA$ where A is —$CH_3$ or —$C_2H_5$ and $n$ is 1 or 2.

It is preferred that the value of $a$ in the silane reactant (I) be 0 thus providing for the presence of 3 of the X groups and no R groups on Si but silanes wherein $a$ is 1 or 2 are operative herein. The substituents represented by X as well as those represented by R when $a$ is 2, can all be the same or they can be different on any one Si atom and mixtures of silane species are operative herein.

The R' radicals in the silane (I) formula are the divalent equivalents of the monovalent radicals defined for R. The R' radicals can be straight chained or branched, aliphatic or aromatic, saturated or unsaturated, entirely hydrocarbon or containing oxygen as C—O—C linkages and so forth as for R. Each R' preferably contains 1–12 carbon atoms and the most preferred radicals are aliphatic saturated hydrocarbons of 1–6 carbon atoms such as —$CH_2$—, —$C_3H_6$—, p-phenylene and n-butylene. Other operative R' groups are —$C_2H_4$—, $$-CH_2CH(CH_3)CH_2CH_2-$$

$$-(CH_2)_3CH(C_2H_5)CH_2CH_2-, -C_6H_3(CH_3)-$$

—$C_6H_2(CH_3)_2$—, —$C_6H_4$—$C_6H_4$—, and —$C_yH_{2y}$—. The R' radicals linked through a single ether oxygen atom as in —R'OR'— can be different as in —$CH_2OCH_2CH_2CH_2$— or identical as in —$C_6H_4OC_6H_4$—.

The epoxy compounds (II) employed herein are well known commercially available materials. It can readily be seen that two major species of materials are described by the formula

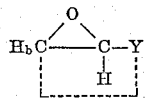

namely; (IIa)

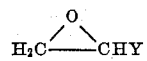

and (IIb)

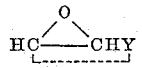

The value of $b$ can be 2 as in (IIa) or it can be 1 as in (IIb). The symbol Y in the epoxy material can represent any of the monovalent hydrocarbon radicals as defined for the symbol R or any of the radicals as defined for R' above as well as a hydrogen atom, any halogenated monovalent or divalent hydrocarbon radical or any epoxy substituted derivative of a monovalent or divalent hydrocarbon radical. Examples of the substituents represented by Y include those examples set forth above for R and for R' as well as H, —$CH_2Cl$, $BrC_6H_4$—, —$CH=CH_2$, —$CH_2OCH_2CH=CH_2$, —$C_6H_4CH=CH_2$, —$CH_2O(C_2H_4O)_nCH_2CH=CH_2$ or an epoxy group. Particular examples of epoxy compounds operable herein are 1,2-epoxyethane, allylglycidylether, divinylbenzene monoxide, butadiene monoxide, vinylcyclohexene-diepoxide, diglycidyl ether, styrene dioxide, epichlorohydrin, propyleneoxide, cyclohexeneoxide, styreneoxide, 1,2 - epoxypropylbenzene, 1 - hexeneoxide, ethylvinylbenzene oxide, vinylcyclohexene oxide, and cyclopentene oxide.

The reaction of silane (I) with epoxy compound (II) is carried out simply by bringing the reactants into intimate contact by any desired means. Reaction occurs at a satisfactory rate at temperatures of from 15° C. to 140° C., preferably 40°–110° C. and at pressures ranging from about atmospheric to several atmospheres e.g. 10 atmospheres pressure. The reactants are employed in almost any desired molar ratio but commercially acceptable yields are obtained with at least one mol of epoxy compound (II) per mol of silane (I) and it is preferred to employ at least 2 mols of epoxy compound per mol of silane. A further excess of epoxy compound (II) does not materially alter the reaction results but neither does it offer any advantage.

The reaction of this invention can be enhanced by carrying it out in an organic solvent which is fluid at the reaction temperatures employed, e.g. aliphatic and aromatic hydrocarbons such as aliphatic petroleum fractions boiling with the range 130°–220° C., benzene, toluene and xylene and cyclic and noncyclic ethers such as ethylene glycol dimethylethyl, ethylene glycol diethylether and dioxane. The reactants can be added to the reaction zone in any desired order. A particularly useful embodiment involves adding the silane to an organic solvent and adding the epoxy compound in gaseous form to the silane-organic solvent solution. Another suggested embodiment involves dissolving the silane in solvent and dissolving the epoxy compound in solvent and thereafter adding the epoxy solution in increments to the silane solution.

Catalysts are not required herein but ease of reaction and improved yield are achieved employing 0.001 to 1% by weight based on the weight of epoxy compound (II) employed, of an alkali metal alcoholate or tin (II) alcoholate or other catalyst known for attaching epoxy groups to primary amino groups. The use of a catalyst is, however, undesirable when the Y substituent contains an epoxy group.

The novel silanes obtained by the reaction described above are novel materials. They are useful in all applications where organosilanes containing amino groups have heretofore been employed. They are useful in the preparation of molded articles and foams based on polyesters, urethanes of polyesters, or polyester amides and polyisocyanates or as adhesives for preparing adhesives by hydrolysis during the preparation of laminates from glass fibers and organic polymers.

The silane products defined by (III) above can be etherified or esterified by replacing any active hydrogen atoms in said silane III with alkali metal atoms and/or halogen atoms and thereafter reacting the silane with (1) a compound of the general formula ZR" where Z is a halogen atom and R" is a monovalent hydrocarbon radical of 1–19 carbon atoms containing aliphatic unsaturation or a monovalent radical of 1–19 carbon atoms containing carbon, hydrogen and oxygen atoms present as —C—O—C— linkages and containing aliphatic unsaturation of (2) a carboxylic acid of the general formula HOOCR''' where R''' is a monovalent hydrocarbon radical of 1–19 carbon atoms having aliphatic unsaturation and optionally containing carboxyl groups (esterified, if desired) or the acid anhydrides or halides corresponding to such carboxylic acid.

The compounds of the formula ZR" employed for the etherification reaction outlined above preferably contain 1–6 carbon atoms per molecule and are illustrated by $ClCH_2CH=CH_2$, $BrCH(CH_3)CH=CH_2$ $FCH_2CH_2OCH_2CH=CH_2$, $ClCH_2CH_2OCH_2CH=CH_2$ and $ClCH_2CH_2OCH_2CH_2OCH_2CH=CH_2$. Particularly useful are allyl chloride, methallyl choride, 2-chloroethylallylether, 2 - chloroethylmethallylether, ethyleneglycolallylether - (2 - chloroethylether), ethyleneglycol - methallylether - (2 - chloroethylether) and the corresponding bromine containing compounds.

The compounds employed for the esterification reaction with the silane (III) are acids represented by the general formula HOOCR" and the corresponding acid anhydrides and acid halides. R''' preferably contains not more than 14 carbon atoms and corresponds to the general formula DD'C=CD'— where D is hydrogen, $C_6H_5$—, $CH_3CH=CH$— or a radical of the formula

where D" is H or a monovalent hydrocarbon of less than 7 carbon atoms, D' is H, —$CH_3$ or

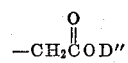

where D" is as above defined, D" can be $CH_3$, $C_2H_5$,

—$CH(CH_3)_2$, —$CH_2CH_2CH_3$, —$CH=CH_2$

—$CH_2CH=CH_2$, $C_6H_5$—, —$C_6H_{11}$, hexyl, butenyl or cyclopentenyl. Particularly useful for the esterification reaction are methacrylic acid, acrylic acid and their acid chlorides, maleic acid and anhydride, fumaric acid and sorbic acid. Other compounds useful in the esterification reaction include aconitic acid, citraconic acid, cinnamic acid, α,β-dimethyl maleic acid and n-butene-2-tetracarboxylic acid-(1,2,3,4) as well as aconitic acid diallylester.

It is not necessary to isolate the products obtained from the reaction of silane (I) with epoxy compounds (II) before etherifying or esterifying them. For the exchange (especially before the esterification with compounds of the general formula X'R" wherein X' is halogen) of the active hydrogen atoms by alkali metal atoms in the reaction products of silane (I) and epoxy compounds (II) it is possible to use lithium, sodium, potassium, rubidium, and/or cesium in the form of their metals, amides or alcoholates with monohydric alcohols with a boiling point under 100° C./760 mm., especially sodium methylate and sodium ethylate. To prepare compounds of the formula MeOR″ where Me is an alkali metal atom the hydroxides of the metals can, of course, also be used if desired instead of the materials named. Preferably a stoichiometric amount of sodium metal, which is best finely dispersed in an inert organic solvent such as toluene or xylene, is added to the silane products (III) and after the evolution of hydrogen has ended the selected compound of the formula X′R″ wherein X′ is halogen is added in stoichiometric quantities, if desired in an excess of one of the two reaction components, particularly of the halogen compound, of the molar quantity. For the acceleration and/or completion of the reaction it can then be heated to 50°–150° C. The reaction occurs satisfactorily at atmospheric pressure. If desired, superatmospheric pressures can also be used. The reaction is completed when no more sodium halide precipitates from the reaction mass. After filtering off sodium halide and distilling off the solvent which can be present, the etherification products are obtained in practically quantitative yield. The same is true for the reaction of silanes (III) wherein Y contains halogen, with compounds of the formula MeOR″.

The esterification is preferably carried out without previous exchange of the active hydrogen atoms in silane (III) with alkali metal atoms. The silane (III) is preferably mixed with acid chlorides or acid anhydrides of the general formula R‴COCl and R‴COOCOR″, wherein R‴ is as defined, in molar quantities, if desired in an excess of the molar quantities. This can take place in an inert solvent such as diethyl ether or toluene. When acid chlorides are employed the acid evolving on the side can be bound by the acid bonding agents common to such esterification reactions, such as pyridine, if desired. To accelerate and/or complete the reaction it can be heated to 40°–150° C. The reaction goes to completion satisfactorily at atmospheric pressure; if desired, superatmospheric pressures can be used.

The compounds prepared according to the present discovery, i.e. compounds of the general formula:

$$X_{3-a}Si-R'-O-R'-N \begin{array}{c} R_a \\ | \\ \end{array} \begin{bmatrix} H_bC-\overset{OA'''}{\underset{|}{C}}-Y \\ | \\ H \end{bmatrix}$$
$$A''$$

wherein X, R, R′, Y, $a$ and $b$ are defined, A″ is hydrogen or a radical of the general formula $$\begin{bmatrix} H_b \\ | \\ -C-C-OA'' \\ | \\ Y \end{bmatrix}$$

and A‴ is hydrogen or R″ or $$\overset{O}{\underset{\|}{C}}R'''$$

always with the definition given, especially those in which A″ is not hydrogen but a radical of the types described, are eminently suitable as adhesives or for the preparation of adhesives by hydrolysis on articles of water insoluble inorganic compounds which contain silicon and hydrogen, viz., the various types of silicon dioxides, clays or asbestos, especially on glass fibers or textiles prepared therefrom; as well as on other solid materials, such as metals such as aluminum, magnesium, iron, and tin. They improve the adherence of articles coated with them toward organic pigments and polymers especially those which were obtained by polymerization or curing by means of aliphatic double and/or triple bonds as well as toward epoxy resins, so that they make the preparation of good laminates and other bonded materials possible. For this purpose silanes with aliphatic unsaturation are preferred in processing polymers of the first type, the other silanes in processing epoxy resins.

The compounds prepared according to the present discovery can also be applied as such to the materials to be rendered adhesive and hydrolyzed in situ by the water film found there. Instead of this the compounds prepared according to the present discovery can be hydrolyzed and the hydrolyzates can then be applied in the form of aqueous solutions or aqueous dispersions or in an organic solvent to the materials to be rendered adhesive. The application can always be made by the usual method such as brushing, dipping or spraying.

The following examples are included herein to assist in practicing the invention. The scope of the invention is defined in the claims and is not limited by the examples.

Example 1

96 g. of 1,2-epoxyethane were conducted into a glass flask fitted with a stirrer, reflux condenser and gas inlet tube containing a solution of 213 g. of the silane of the formula $(CH_3O)_3SiCH_2OCH_2CH_2NH_2$ in 400 g. toluene, at 80° to 100° C. over a period of 90 minutes while stirring rapidly. After distilling off the toluene there was obtained a quantitative yield of silane of the formula $$(CH_3O)_3SiCH_2OCH_2CH_2N(CH_2CH_2OH)_2$$

remains as a colorless, oily fluid. In close agreement with the calculated values the silane product contained 9.9 wt. percent Si and 4.9 wt. percent N.

Example 2

A solution of 195 g. of silane of the formula $$(CH_3O)_3SiCH_2OCH_2CH_2NH_2$$

in 400 g. toluene was added in dropwise fashion to 185 g. epichlorhydrin at 80°–100° C. over a period of 90 minutes, stirring rapidly, in a glass flask equipped with stirrer, reflux condenser and dropping funnel. After terminating the addition of the epichlorhydrin, the reaction mass was heated for another hour, while stirring, to 80° to 100° C. and finally the toluene was distilled off. A quantitative yield of 380 g. of the silane of the formula $$(CH_3O)_3SiCH_2OCH_2CH_2N(CH_2CHOHCH_2Cl)_2$$

remained as a colorless, oily fluid. It contained 7.4% by weight Si, 3.7% by weight N and 18.61% by weight Cl in close agreement with the calculated values.

Example 3

A solution of 195 g. of silane of the formula $$(CH_3O)_3SiCH_2OCH_2CH_2NH_2$$

in 400 g. toluene was added in dropwise fashion with concurrent rapid stirring to 228 g. allylglycidylether in a glass flask equipped with stirrer, reflux condenser and dropping funnel at 80°-100° C. over a period of 3 hours. After distilling off the toluene, a quantitative yield of 421 g. of silane of the formula $(CH_3O)_3SiCH_2OCH_2CH_2$
$\quad N(CH_2CHOHCH_2OCH_2—CH=CH_2)_2$ was obtained. The silane product was a colorless, oily fluid which contained 6.6% by weight Si and 3.3% by weight N in close agreement with the calculated values.

Example 4

42 g. of the silane obtained according to Example 3 was dissolved in 100 ml. diethylether, mixed with 16 g. pyridine and then mixed dropwise while stirring with 18 g. with acrylic acid chloride. After filtering off the pyridine hydrochloride and evaporating the ether a quantitative yield of 53 g. of silane of the formula $(CH_3O)_3SiCH_2OCH_2CH_2N[CH_2CH$
$\quad (OOCCH=CH_2)CH_2OCH_2CH=CH_2]_2$ was obtained. This product was a yellowish oil which

Example 5

28 g. of the compound obtained according to Example 1 was dissolevd in 100 ml. of diethyl ether, mixed with 16 g. pyridine and then mixed dropwise while stirring with 18 g. of acrylic acid chloride. After filtering off from the pyridine hydrochloride and evaporating the ether 39 g. of the silane of the formula $$(CH_3O)_3SiCH_2OCH_2CH_2N(CH_2CH_2OOCCH=CH_2)_2$$

was obtained. The product was a yellowish oil which contained 7.2% by weight Si and 3.6% by weight N in close agreement with the calculated values.

Example 6

A solution of 140 g. (1)-vinylcyclohexene-(3)-diepoxide in 200 g. toluene was mixed dropwise while stirring rapidly with a solution of 97 g. of silane of the formula $(CH_3O)_3SiCH_2OCH_2CH_2NH_2$ in 200 g. toluene at 90° to 100° C. within 2 hours in a glass flask equipped with stirrer, reflux condenser and dropping funnel. The reaction mass was then heated for another two hours while stirring to 100° to 110° C. After distilling off the toluene at 12 mm. Hg, 236 g. of the silane of the formula:

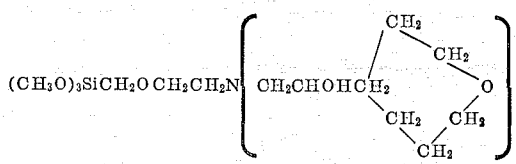

was obtained. The product was a pale yellow oil containing 0.042 equivalent epoxy groups per 10 g.

Example 7

88 g. ethylene oxide was conducted into a solution of 223 g. of silane of the formula $$(CH_3O)_3SiCH_2CH_2CH_2OCH_2CH_2NH_2$$

in 400 g. toluene at 80° to 100° C. over a period of 90 minutes, while stirring rapidly, in a glass flask equipped with stirrer, reflux condenser and gas inlet tube.

The reaction product thus obtained was added dropwise to 196 g. maleic acid anhydride in 200 g. toluene at 90° to 110° C. over a period of 2 hours while stirring rapidly. After completing the addition the reaction mass was stirred for another two hours at 90° to 110° C. and finally the toluene was distilled off. The product was 504 g. of silane of the formula $$(CH_3O)_3SiCH_2CH_2CH_2OCH_2CH_2N(CH_2CH_2OOCCH=CHCOOH)_2$$

The product was a yellowish oil which contained 0.039 equivalents of free carboxyl groups per 10 g., in close agreement with the calculated value.

Example 8

A solution of 502 g. of the silane of the formula $$[C_2H_5O(C_2H_4O)_2]_3SiCH_2OCH_2CH_2NH_2$$

in 500 g. toluene was mixed while stirring rapidly with 185 g. epichlorhydrin over a period of one hour at 60° to 80° C. in a glass flask equipped with stirrer, reflux condenser and dropping funnel, and it was stirred for another hour at 100° to 110° C.

From a dispersion of 46 g. Na in 500 g. toluene and 205 g. ethylene glycol-monoallylether a suspension of the alcoholate is prepared and added in small quantities to the solution of the reaction product prepared as described above from aminoorganosilane and epichlorhydrin which was being stirred rapidly at 100° to 110° C. Sodium chloride precipitated immediately. After another hour of stirring at 100° to 110° C., it was filtered off from the sodium chloride and the toluene was distilled off from the filtrate at 12 mm. Hg. After filtering through active carbon 800 g. of the silane of the formula $$[C_2H_5O(C_2H_4O)_2]_3SiCH_2OCH_2CH_2N(CH_2CHOHCH_2OC_2H_4OCH_2CH=CH_2)_2$$

in the form of a pale yellow oil was obtained which consumed 402 mg. Br per g. in close agreement with the calculated value.

Example 9

A dispersion of 23 g. sodium in 230 g. toluene was added at room temperature in small quantities to 409 g. of the oil obtained according to Example 8 in 400 g. toluene while stirring rapidly. After the hydrogen evolution had ended, the reaction mass was heated to 40° to 50° C. and a solution of 77 g. allyl chloride in 150 g. toluene was added dropwise over a period of 2 hours. Then, while continuing rapid stirring, the reaction mass was allowed to cool to room temperature. After filtering off the sodium chloride, distilling off the toluene at 12 mm. Hg and filtering the residue with active carbon, 445 g. of the silane of the formula $$[C_2H_5O(C_2H_4O)_2]_3SiCH_2OCH_2CH_2N[CH_2CH(OCH_2CH=CH_2)CH_2OC_2H_4OCH_2CH=CH_2]_2$$

in the form of a yellowish oil was obtained consuming 744 mg. bromine/g. which is in close agreement with the calculated value.

Example 10

Equivalent results were achieved when Example 1 was repeated employing the silanes listed below to produce the corresponding products.

$(CH_3O)_2CH_3SiCH_2OCH_2CH_2NH_2$
$CH_3O(CH_3)_2SiCH_2OCH_2CH_2NH_2$
$Cl_3SiCH_2OCH_2CH_2NH_2$
$(C_6H_{13}O)_3SiCH_2OCH_2CH_2NH_2$
$(C_6H_5O)_3SiCH_2OCH_2CH_2NH_2$
$[CH_3(OC_2H_4)_2]_3SiCH_2OCH_2CH_2NH_2$
$[C_2H_5(OC_2H_4)_3]_2C_2H_5SiCH_2OCH_2CH_2NH_2$
$[(CH_3)(C_2H_5)N]_3SiCH_2OCH_2CH_2NH_2$

Example 11

Equivalent results were achieved when the following silanes were employed in the method of Example 2 to produce corresponding products.

$(CH_3O)_2C_2H_5SiCH_2OCH_2CH_2NH_2$
$(CH_3O)(C_6H_5)_2SiCH_2OCH_2CH_2NH_2$
$(CH_3O)(C_6H_{11})(CH_2=CH)SiCH_2OCH_2CH_2NH_2$
$(C_2H_5O)_2C_{19}H_{39}SiCH_2OCH_2CH_2NH_2$
$(C_5H_{11}O)_2(CH_3C_6H_4)SiCH_2OCH_2CH_2NH_2$
$(CH_3O)(C_2H_5O)(C_6H_5C_2H_4)SiCH_2OCH_2CH_2NH_2$

Example 12

Equivalent results were achieved when Example 1 was repeated employing the silane listed below to produce the corresponding silane product.

$$(CH_3O)_3SiCH_2CH_2OCH_2CH_2NH_2$$

Example 13

Equivalent results were achieved when Example 1 was repeated employing the epoxy compounds listed below to produce the corresponding silane products.

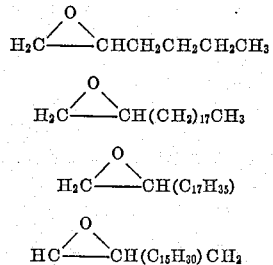

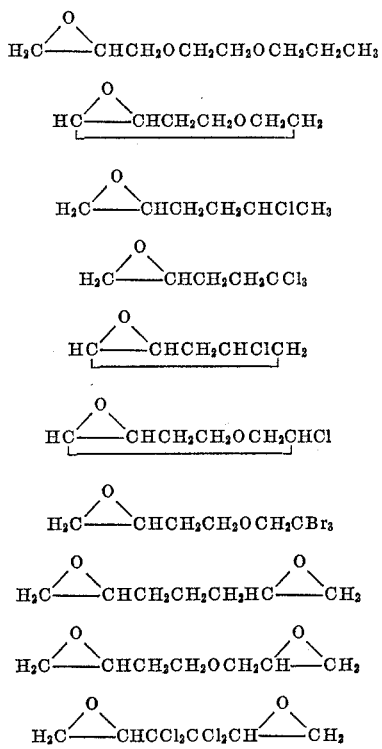

That which is claimed is:
1. A silane of the general formula $$R_aX_{3-a}SiR'OR'NH_x[CH_bCH(OH)Y]_{2-x}$$

where $x$ is an integer from 1 to 2 inclusive, $a$ has a value from 0–2 inclusive, $b$ is an integer from 1 to 2 inclusive, R is a monovalent hydrocarbon radical of 1–19 inclusive carbon atoms, R' is a divalent hydrocarbon radical of 1–12 inclusive carbon atoms, X is a hydrolyzable substituent free of active hydrogen and Y is a substituent selected from the group consisting of
  (a) hydrogen atoms,
  (b) monovalent hydrocarbon radicals of 1–19 carbon atoms and $b=2$, and divalent hydrocarbon radicals of 1–19 carbon atoms and $b=1$,
  (c) monovalent radicals composed of hydrogen, 1–19 carbon atoms and oxygen atoms which are present as —COC— linkages and $b=2$ and divalent radicals composed of hydrogen, 1–19 carbon atoms and oxygen atoms which are present as C—O—C linkages and $b=1$,
  (d) halogenated derivatives of (b) and (c) and
  (e) epoxy derivatives of (b), (c) and (d).

2. A silane in accordance with claim 1 wherein $a$ is 0, X is alkoxy, $b$ is 2 and Y=a monovalent hydrocarbon radical of 1–19 carbon atoms.

3. A silane in accordance with claim 1 wherein $a$ is 0, X is alkoxy, $b$ is 1 and Y is a divalent hydrocarbon radical of less than 20 carbon atoms.

References Cited
UNITED STATES PATENTS

| | | |
|---|---|---|
| 3,012,006 | 12/1961 | Holbrook et al. __ 260—448.2 XR |
| 3,032,577 | 5/1962 | Morehouse. |
| 3,046,250 | 7/1962 | Plueddemann __ 260—448.2 XR |
| 3,259,518 | 7/1966 | Sterman et al. __ 260—448.2 XR |
| 3,334,121 | 8/1967 | Pepe et al. |

TOBIAS E. LEVOW, *Primary Examiner.*

P. F. SHAVER, *Assistant Examiner.*